Jan. 8, 1929.  1,698,455

B. SCHLEICHER

FITTING FOR PNEUMATIC TIRE VALVES

Filed Aug. 16, 1927

INVENTOR
B. SCHLEICHER,
BY Jno Imirie ATTY.

Patented Jan. 8, 1929.

1,698,455

UNITED STATES PATENT OFFICE.

BERNARD SCHLEICHER, OF HAZELBROOK, NEW SOUTH WALES, AUSTRALIA.

FITTING FOR PNEUMATIC-TIRE VALVES.

Application filed August 16, 1927, Serial No. 213,408, and in Australia April 5, 1927.

This invention relates to an improved retaining device or holder for the valve cap of a pneumatic tire valve.

Motorists and cyclists are well aware of the inconveniences and difficulties caused by the inadvertent loss of tire valve caps.

The present invention has been devised to provide improved devices which will effectively overcome these disadvantages.

In the accompanying drawings:—

In these views 2 indicates the stem of a tire valve, 3 the valve screw cap and 4 the usual nut provided for securing the valve to the wheel rim.

Figure 1:
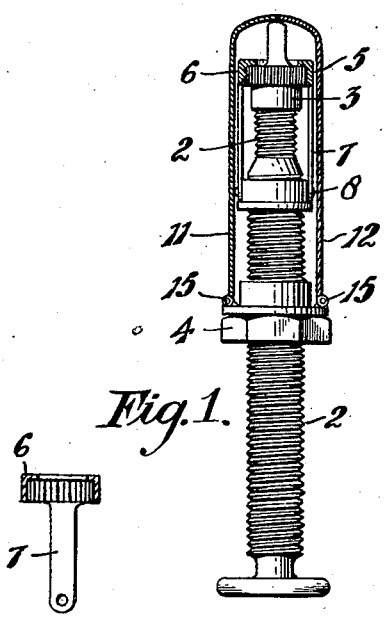
Figure 1 is a sectional view of a valve of a pneumatic tire equipped with the improved valve cap retaining device.
Figure 3:
Figure 3 is a sectional view of the clip device shown in Figure 2.
Figure 2:
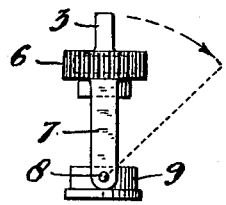
Figure 2 is a detail view of the retaining device for the valve cap.

According to the invention, I provide a valve cap retaining device 5 comprising a spring clip 6 of arcuate design adapted to fit around and embrace the valve screw cap 3 as shown in Figure 2. This spring clip 6 has downwardly extending legs 7 which are arranged one on each side of the valve stem, and they are pivotally connected at their lower ends to pins 8 carried by a collar 9. This collar is screwed onto the valve stem 2 so that it can be rotated simultaneously with and to the same degree as the valve cap 3.

The spring clip 6 is preferably serrated on its inner surface to firmly grip the periphery of the valve cap 3, and, if desired, said clip may also be serrated on its outer surface, as is shown in Figure 6 whereby it can be conveniently rotated.

When it is desired to remove the valve cap 3 from the valve stem, the retaining device 5 and the valve cap are rotated until the said cap is unscrewed free from the valve stem. The retaining device is now pivotally swung downwardly on the pins 8 as shown in dotted lines in Figure 6, thereby allowing free connection of an inflator or a connection from a compressed air tank and preventing misplacement of the valve cap.

What I do claim is:—

A retaining device for the caps of pneumatic tire valve stems, comprising a collar adapted for threaded connection with the stem, legs pivotally connected to the collar, and a spring clip carried by the legs to receive and frictionally hold the valve stem cap, said clip including a depending portion in which the body of the cap is inserted and frictionally held against casual independent movement.

In testimony whereof I affix my signature.

BERNARD SCHLEICHER.